(12) United States Patent
Juhassz et al.

(10) Patent No.: US 8,776,637 B2
(45) Date of Patent: Jul. 15, 2014

(54) HYDRAULIC FLUID TRANSFER ASSEMBLY

(75) Inventors: David Juhassz, Sterling Heights, MI (US); Lynn M. Krawczyk, Plymouth, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 274 days.

(21) Appl. No.: 13/345,141

(22) Filed: Jan. 6, 2012

(65) Prior Publication Data
US 2013/0175135 A1    Jul. 11, 2013

(51) Int. Cl.
*F16H 61/00*    (2006.01)
*F16K 31/12*    (2006.01)
*F16D 25/12*    (2006.01)

(52) U.S. Cl.
USPC ............... 74/606 R; 137/614.05; 137/884; 141/351; 251/149.6

(58) Field of Classification Search
None
See application file for complete search history.

(56) References Cited

U.S. PATENT DOCUMENTS 4,378,028 A * 3/1983 Weber et al. ............. 137/614.05
5,277,402 A * 1/1994 Szabo ........................ 251/149.6

* cited by examiner

*Primary Examiner* — Rodney Bonck

(57) ABSTRACT

A fluid retention assembly for a vehicle transmission has a valve housing, a first member, a second member, and a biasing member. The valve housing has a first portion, a second portion, a third portion, and defines a central bore having a sealing portion. The first member is disposed at least partially in the central bore of the valve housing and includes a shaft portion and a sealing portion. The second member defines a plurality of fluid apertures. The second member is attached to the shaft portion of the first member opposite the sealing portion. The biasing member is disposed at least partially in the central bore of the valve housing coaxial with the first member and has a biasing force that biases the sealing portion of the first member against the sealing portion of the valve housing.

19 Claims, 3 Drawing Sheets

HYDRAULIC FLUID TRANSFER ASSEMBLY

FIELD

The invention relates generally to hydraulic fluid transfer assemblies for vehicle transmissions.

BACKGROUND

The statements in this section merely provide background information related to the present disclosure and may or may not constitute prior art.

A typical multiple speed transmission uses hydraulic fluid for various purposes, such as actuating clutches and brakes. The hydraulic fluid may pass between assemblies of the transmission so that the hydraulic fluid exits a fluid passageway of one assembly to enter a fluid passageway of another assembly. When the assemblies are assembled or disassembled, the hydraulic fluid may drain or leak from one or the other of the assemblies. Such drainage or leak has financial and environmental costs. Accordingly, there is a need for an improved transmission assembly that restricts fluid leakage.

SUMMARY

A fluid retention assembly for a vehicle transmission has a valve body, a first member, a second member, and a biasing member. The valve housing has a first portion, a second portion, a third portion, and defines a central bore having a sealing portion. The first portion is substantially cylindrically shaped and has a first diameter, the second portion is adjacent the first portion and has a substantially cylindrical shape that is coaxial with the first portion and has a second diameter that is larger than the first diameter of the first portion, and the third portion is adjacent the second portion and has a substantially cylindrical shape that is coaxial with the first and second portions. The first member is disposed at least partially in the central bore of the valve housing and includes a shaft portion and a sealing portion opposing the sealing portion of the valve housing. The second member is substantially disc shaped and defines a plurality of fluid apertures. The second member is attached to the shaft portion of the first member opposite the sealing portion. The biasing member is disposed at least partially in the central bore of the valve housing coaxial with the first member and has a biasing force that biases the sealing portion of the first member against the sealing portion of the valve housing. A bi-directional fluid flow between the first portion and the third portion of the valve housing is substantially restricted in the absence of an external net force on the first and second members. The bi-directional fluid flow is substantially unrestricted when the external net force on the first and second members exceeds the biasing force of the biasing member.

In another aspect, the fluid retention assembly further includes a hydraulic assembly. The hydraulic assembly includes a housing, a fluid passageway in hydraulic communication with an exterior of the housing, and a hydraulic distribution system in hydraulic communication with the fluid passageway. The first portion of the valve housing is sealed to the fluid passageway and the second portion of the valve housing is sealed to the housing of the hydraulic assembly. An ingress of dust and contaminants to the fluid passageway of the hydraulic assembly is substantially restricted when the external net force on the first and second members is less than the biasing force of the biasing member.

In yet another aspect, the hydraulic distribution system of the hydraulic assembly includes a plurality of valves for selectively distributing fluid through the fluid passageway.

In yet another aspect, the fluid retention assembly further includes a gearbox fixed to the hydraulic assembly. The gearbox includes a housing, a plurality of gears, a clutch selectively engageable with the plurality of gears, a hydraulic actuator for actuating the clutch, and a fluid passageway in hydraulic communication with the hydraulic actuator and an exterior of the housing of the gearbox.

In yet another aspect, the first portion of the valve housing is press fit into the fluid passageway of the hydraulic assembly and the third portion of the valve housing is sealed against the fluid passageway of the gearbox. The fluid passageway of the gearbox further includes a shoulder portion and the shoulder portion abuts the second member to provide the external net force In yet another aspect, the valve housing further defines a shoulder portion in the central bore. The biasing member abuts the second member and the shoulder portion of the valve housing to bias the first member.

In yet another aspect, the sealing portion of the valve housing includes a conical surface and the sealing portion of the first member includes a conical surface. The conical surface of the valve housing seals with the conical surface of the first member.

In yet another aspect, the sealing portion of the first member further includes a cylindrical surface. The cylindrical surface of the first member seals against an interior surface of the valve housing.

In yet another aspect, the valve housing includes a first component, a second component, and a third component. The first component defines the first portion and a portion of the second portion of the valve housing, the second component defines a portion of the second portion of the valve housing, and the third component defines the third portion and a portion of the second portion of the valve housing. The first and third components each include a substantially cylindrical inner surface and the second component defines a plurality of circumferentially spaced fluid apertures disposed in the central bore of the valve housing.

In yet another aspect, the sealing portion of the first member defines a plurality of fluid apertures that are circumferentially offset from the plurality of fluid apertures of the second component of the valve housing.

In yet another aspect, the second component of the valve housing includes a rotation restriction feature to restrict rotation of the shaft of the first member.

In yet another aspect, the biasing member abuts the sealing portion of the first member to bias the first member against the second component of the valve housing and restrict fluid flow through the valve housing.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
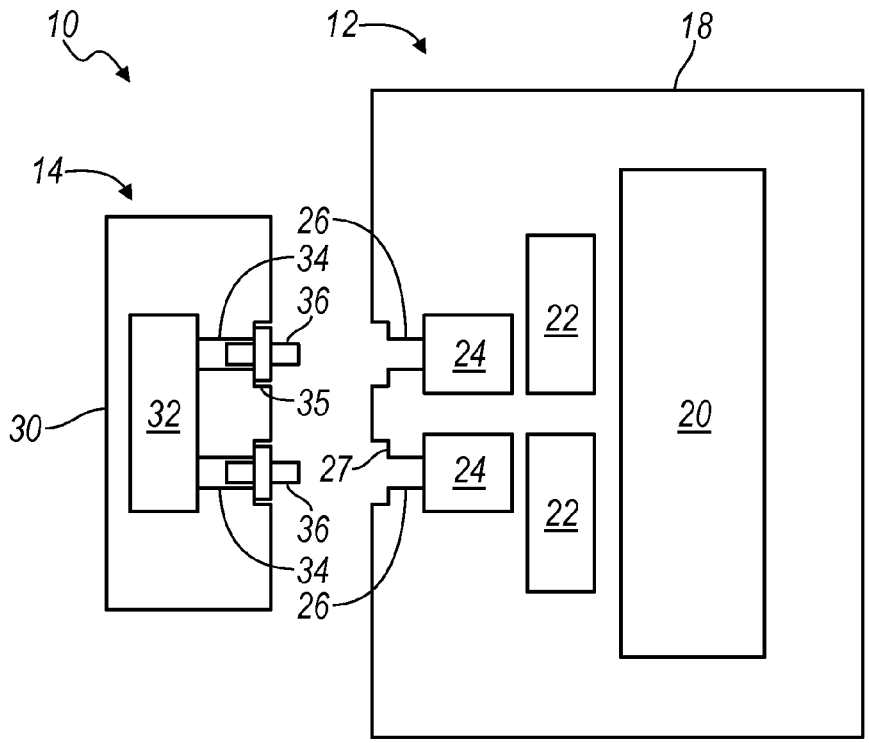
FIG. 1 is a schematic diagram of fluid distribution assembly according to the principles of the present invention.

Referring to FIG. 1, a schematic diagram of a transmission system 10 is illustrated. The transmission system 10 provides a plurality of gear or speed ratios between an engine shaft (not shown) and a transmission output (not shown). The transmission system 10 includes a gearbox 12 and a hydraulic distribution assembly or powerpack 14. The gearbox 12 includes a gearbox housing or transmission housing 18, plurality of gears 20, a plurality of torque transmitting devices 22, a plurality of clutch actuators 24, and a plurality of fluid passages 26. In the example provided, the torque transmitting devices 22 are dual clutches 22 of an automated manual or dual clutch transmission. The clutch actuators 24 are cylinders of a concentric slave cylinder assembly for actuating the dual clutches 22. It should be appreciated that other clutches 22 and actuators 24 may be used without departing from the scope of the present invention. The fluid passages 26 include counter bored shoulder portions 27 and are in fluid communication with the actuators 24 and the transmission housing 18 for transferring bi-directional fluid flow between the outside of the transmission housing 18 and the actuators 24, as will be described below.

The powerpack 14 includes a powerpack housing 30, a hydraulic distribution system 32, a plurality of fluid passageways 34, and a plurality of valve assemblies 36. The powerpack housing 30 is secured to the transmission housing 18 so that the fluid passageways 26 of the gearbox 12 are aligned with the fluid passageways 34 of the powerpack 14. In the example provided, the hydraulic distribution system 32 includes a plurality of valves or solenoids for distributing hydraulic fluid to the actuators 24. The fluid passageways 34 include counter bored shoulder portions 35 and are in fluid communication between the hydraulic distribution system 32 and the powerpack housing 30 for transferring bi-directional fluid flow between the outside of the powerpack housing 30 and the fluid distribution system 32, as will be described below.

Figure 2:
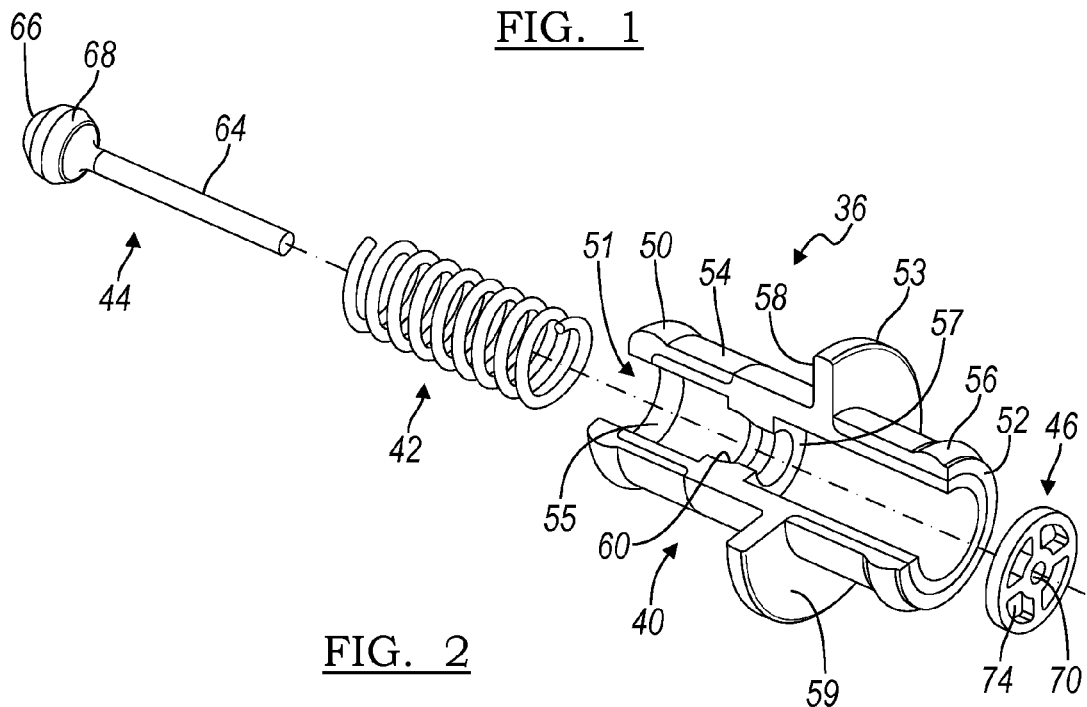
FIG. 2 is an exploded view of an embodiment of a valve assembly according to the principles of the present invention.
Figures 3A, 3B:
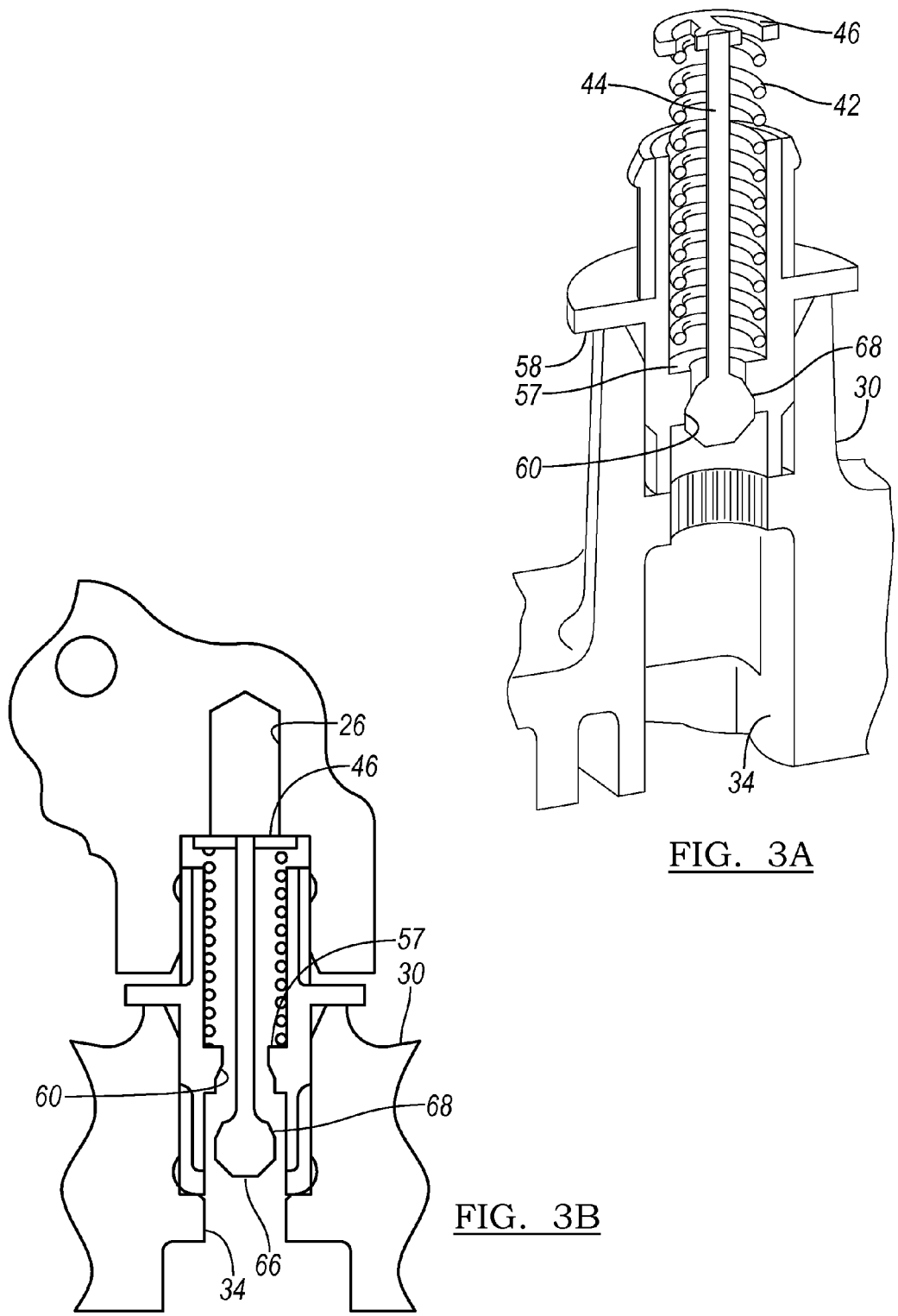
FIG. 3A is a cutaway view of the valve assembly of FIG. 2 in a closed position according to the principles of the present invention.
FIG. 3B is a cutaway view of the valve assembly of FIG. 2 in an open position according to the principles of the present invention.
Figure 4:
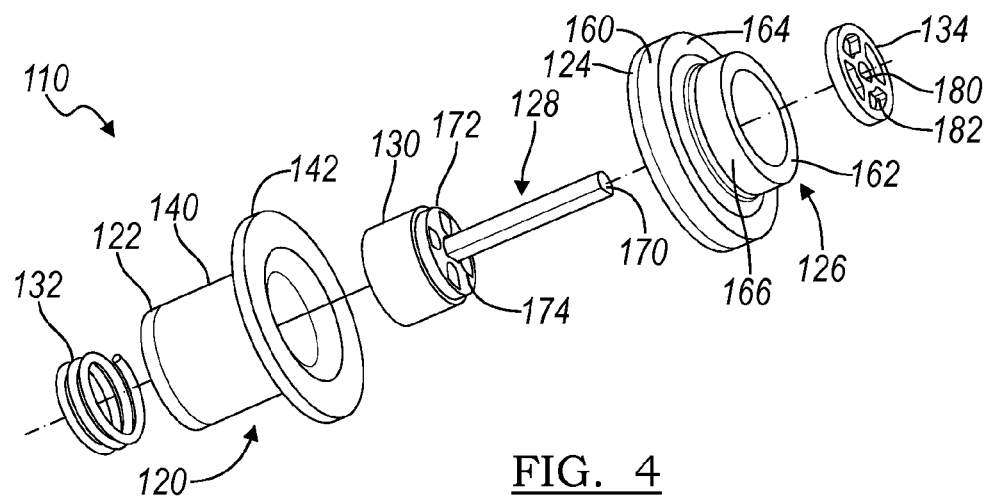
FIG. 4 is an exploded view of an embodiment of a valve assembly according to the principles of the present invention.

Referring now to FIGS. 2, 3A, and 3B, and with continued reference to FIG. 1, an embodiment of a valve assembly 36 is illustrated. The valve assemblies 36 each include a valve housing 40, a spring 42, a plunger 44, and a reaction plate 46. In the example provided, the valve housing 40 is machined steel. It should be appreciated that other materials may be used without departing from the scope of the present invention. The valve housing 40 is generally annular in shape and has a first end 50, a second end 52, a disc portion 53, and defines a central bore 51. The first end 50 press fits into the fluid passageway 34 and has an outer surface 54, and an end surface 55. The outer surface 54 radially seals against the fluid passageway 34 when the valve assembly 36 is installed in the powerpack 14. The end surface 55 is disposed on a radially inner and axially outer portion of the first end 50 for sealing with the plunger 44, as will be described below. The central bore 51 has a shelf portion 57 and an inner sealing portion 60. The shelf portion 57 has a diameter less than a diameter of the remainder of the first end 50 for seating the spring 42. The inner sealing portion 60 includes a conically shaped bore to seal with the plunger 44, as will be described below. The second end 52 has an outer surface 56 that radially seals against the fluid passageway 26 when the powerpack 14 is assembled with the gearbox 12. The disc portion 53 is disposed between the first end 50 and the second end 52 and has a first surface 58 and a second surface 59. The diameter of the disc portion 53 is larger than the diameter of the first end 50 and the diameter of the second end 52. The first surface 58 opposes and seals against the powerpack housing 30 when the valve assembly 36 is installed in the fluid passageway 34. The second surface 59 opposes the gearbox 12 when the powerpack 14 is installed on the gearbox 12. In the example provided, the outer surfaces 54, 56, the end surface 55, and the first surface 58 are over-molded rubber to provide beneficial sealing characteristics. It should be appreciated that other shapes and materials may be incorporated without departing from the scope of the present invention.

The spring 42 is disposed at least partially in the central bore 51 of the valve housing 40 and is seated on the shelf portion 57. The spring 42 biases the reaction disc 46 to urge the plunger 44 against the end surface 55 of the valve housing 40. In the example provided, the spring 42 is a coil spring. It should be appreciated that other types and shapes of biasing members may be incorporated without departing from the scope of the present invention.

The plunger 44 has a shaft portion 64 and a bulb portion 66. The bulb portion 66 is disposed at an end of the shaft portion 64 and has a bulb surface 68. In the example provided, the shaft portion 64 and the bulb portion 66 are steel and the bulb surface 68 is over-molded rubber. The bulb surface 68 has a conical portion to seal against the conical bore of the inner sealing portion 60 of the valve housing 40 and a cylindrical portion to seal radially against the central bore 51 of the valve housing 40.

The reaction plate 46 is substantially disc shaped and defines a center aperture 70 and a plurality of fluid apertures 74. The center aperture 70 is press fit onto the shaft portion 64 of the plunger 44. The fluid apertures 74 allow fluid to flow through the reaction plate 46, as will be described below.

The operation of the valve assembly 36 will now be described with continued reference to FIGS. 1, 3A, and 3B. In FIG. 3A the valve assembly 36 is illustrated as installed in the powerpack 14 when the powerpack 14 and the gearbox 12 are separated. The spring 42 presses against the shelf portion 57 of the valve housing 40 and biases the reaction plate 46 away from the valve housing 40. The reaction plate 46 transfers force to the shaft portion 64 of the plunger 44 to urge the bulb portion 66 of the plunger 44 towards the inner sealing portion 60 of the valve housing 40. When the powerpack 14 is not assembled with the gearbox 12 and there is no net external force on the reaction plate 46, the bulb surface 68 seals against the inner sealing portion 60 and the inner portion of the valve housing 40. Accordingly, hydraulic fluid is restricted from leaking out of the fluid passageway 34 and the fluid distribution system 32.

When the powerpack 14 is assembled with the gearbox 12 as illustrated in FIG. 3B, hydraulic fluid is permitted to flow through the valve assembly 36. The shoulder portion 27 of the fluid passageway 26 transfers a net external force to the reaction plate 46 to urge the reaction plate 46 toward the valve housing 40. The reaction plate 46 transfers force to the shaft portion 64 of the plunger 44 to urge the bulb portion 66 of the plunger 44 away from the inner sealing portion 60 of the valve housing 40. Accordingly, when the powerpack 14 is assembled with the gearbox 12, hydraulic fluid is permitted to flow bi-directionally through valve housing 40, through the spring 42, and through the fluid apertures 74 of the reaction plate 46.

Referring now to FIGS. 4, 5, 6A, and 6B, and with continued reference to FIG. 1, an alternative embodiment of a valve assembly 110 is illustrated. The valve assembly 110 includes a valve housing 120, a first seal 122, a sealing plate 124, a second seal 126, a piston 128, a third seal 130, a spring 132, and a reaction plate 134. The valve housing 120 is generally annular in shape and has a first portion 140 having a first diameter and a second portion 142 having a diameter that is larger than the diameter of the first portion 140. The first seal 122 is molded to the valve housing 120 at an end of the first portion 140 for sealing against the shoulder portion 35 of the powerpack housing 30.

Figure 5:
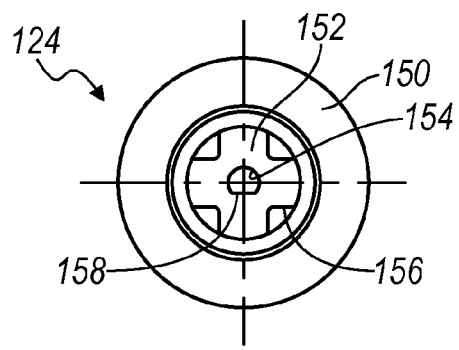
FIG. 5 is a top view of a component of the valve assembly of FIG. 4 according to the principles of the present invention.

The sealing plate 124 has an outer disc portion 150 and an inner disc portion 152, as is best seen in FIG. 5. The inner disc portion 152 is connected to the outer disc portion 150 and defines a center aperture 154 and a plurality of fluid apertures 156. The center aperture 154 has a notched portion 158 to restrict rotation of the piston 128, as will be described below.

The second seal 126 is molded to the sealing plate 124 and includes a first portion 160 and a second portion 162. The first portion 160 abuts the sealing plate 124 and has a seal face 164 that opposes the gearbox housing 18 when the powerpack 14 is assembled with the gearbox 12. The second portion 162 is generally annular in shape and has a diameter that is less than the diameter of the first portion 160. The second portion 162 has an outer surface 166 for radial sealing with the fluid passageway 26 when the powerpack 14 is assembled with the gearbox 12.

The piston 128 has a shaft portion 170 and a disc portion 172. The shaft portion 170 has a notched cross section that cooperates with the notch 158 of the center aperture 154 of the sealing plate 124 when the valve assembly 110 is assembled to restrict rotation of the piston 128. The disc portion 172 is fixed to the shaft portion 170 and defines a plurality of fluid apertures 174. The fluid apertures 174 are arranged so that they are circumferentially staggered with respect to the fluid apertures 156 of the sealing plate 124. Accordingly, when the disc portion 172 contacts the sealing plate 124, fluid is restricted from passing through the valve assembly 110. The third seal 130 is substantially annular in shape and is molded to the disc portion 172.

The spring 132 is disposed between the first seal 122 and the shoulder portion 35 of the fluid passageway 34 of the powerpack 14. The reaction plate 134 defines a notched center aperture 180 and a plurality of fluid apertures 182. The reaction plate 134 is disposed on the shaft portion 170 of the piston 128.

Figure 6A:
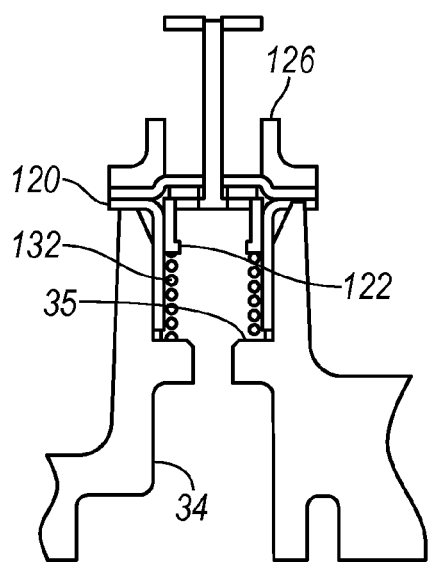
FIG. 6A is a cutaway view of the valve assembly of FIG. 4 in a closed position according to the principles of the present invention.

The operation of the valve assembly 110 will now be described with continued reference to FIGS. 1, 4, 5, 6A, and 6B. In FIG. 6A the valve assembly 110 is illustrated as installed in the powerpack 14 when the powerpack 14 is separated from the gearbox 12 and there is no net external force on the reaction plate. The spring 132 presses against the shoulder portion 35 of the fluid passageway 34 and biases the third seal 130 away from the powerpack 14. The third seal 130 urges the disc portion 172 of the piston 128 against the sealing plate 124. When the powerpack 14 is not assembled with the gearbox 12, the disc portion 172 of the piston 128 seals against the sealing plate 124. Hydraulic fluid disposed in the fluid apertures 174 are restricted from passing through the sealing plate 124 due to the staggered alignment of the fluid apertures 156. Accordingly, hydraulic fluid is restricted from leaking out of the fluid passageway 34 and the fluid distribution system 32.

Figure 6B:
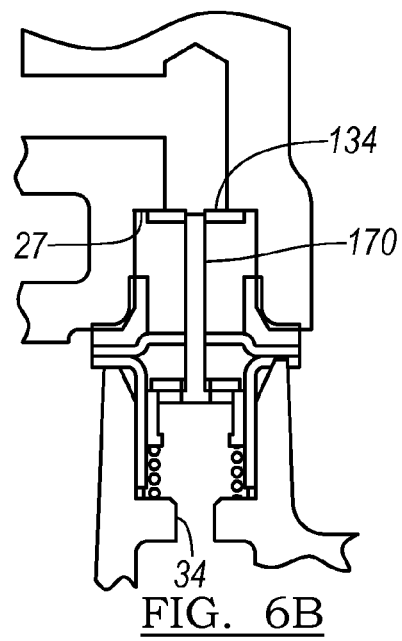
FIG. 6B is a cutaway view of the valve assembly of FIG. 4 in an open position according to the principles of the present invention.

When the powerpack 14 is assembled with the gearbox 12 as illustrated in FIG. 6B, hydraulic fluid is permitted to flow bi-directionally through the valve assembly 36. The shoulder portion 27 of the fluid passageway 26 provides a net external force to the reaction plate 134 to urge the reaction plate 134 towards the powerpack housing 30. The reaction plate 134 transfers force to the shaft portion 170 of the piston 128 to urge the disc portion 172 of the piston 128 away from the sealing plate 124. Accordingly, when the powerpack 14 is assembled with the gearbox 12, hydraulic fluid is permitted to flow in both directions through the spring 132, through the first seal 122, through the valve housing 120, through the third seal 130, through the fluid apertures 174 of the disc portion 172 of the piston 128, through the fluid apertures 156 of the sealing plate 124, and through the fluid apertures 182 of the reaction plate 134.

The provided embodiments of the present invention offer advantageous fluid retention characteristics for a powerpack assembly that is detached from a corresponding gearbox. The embodiments additionally provide advantageous installation characteristics such as coupling and de-coupling in a blind assembly process of two oil containing assemblies without external physical interaction with the valve assembly. Accordingly, powerpack assemblies may be pre-loaded with hydraulic fluid before shipping and assembly to a gearbox. The valve assembly further restricts ingress of dust and contaminants into the hydraulic system, and therefore improves storage abilities of the assembly.

The description of the invention is merely exemplary in nature and variations that do not depart from the gist of the invention are intended to be within the scope of the invention. Such variations are not to be regarded as a departure from the spirit and scope of the invention.

The following is claimed:

1. A fluid retention assembly for a vehicle transmission, the fluid retention assembly comprising:
   a valve housing having a first portion, a second portion, a third portion, and defining a central bore having a sealing portion, wherein the first portion is substantially cylindrically shaped and has a first diameter, the second portion is adjacent the first portion and has a substantially cylindrical shape that is coaxial with the first portion and has a second diameter that is larger than the first diameter of the first portion, and wherein the third portion is adjacent the second portion and has a substantially cylindrical shape that is coaxial with the first and second portions;
   a first member disposed at least partially in the central bore of the valve housing and including a shaft portion and a sealing portion opposing the sealing portion of the valve housing;
   a second member that is substantially disc shaped and defines a plurality of fluid apertures, wherein the second member is attached to the shaft portion of the first member opposite the sealing portion; and
   a biasing member disposed at least partially in the central bore of the valve housing coaxial with the first member and having a biasing force that biases the sealing portion of the first member against the sealing portion of the valve housing, and a hydraulic assembly, wherein the hydraulic assembly includes a housing, a fluid passageway in hydraulic communication with an exterior of the housing, and a hydraulic distribution system in hydraulic communication with the fluid passageway, and wherein the first portion of the valve housing is sealed to the fluid passageway and the second portion of the valve housing is sealed to the housing of the hydraulic assembly, and wherein an ingress of dust and contaminants to the fluid passageway of the hydraulic assembly is substantially restricted when the external net force on the first and second members is less than the biasing force of the biasing member; and wherein a bi-directional fluid flow between the first portion and the third portion of the valve housing is substantially restricted in the absence of an external net force on the first and second members and the bi-directional fluid flow is substantially unrestricted when the external net force on the first and second members exceeds the biasing force of the biasing member.

2. The fluid retention assembly of claim 1 wherein the hydraulic distribution system of the hydraulic assembly includes a plurality of valves for selectively distributing fluid through the fluid passageway.

3. The fluid retention assembly of claim 1 further including a gearbox fixed to the hydraulic assembly, wherein the gearbox includes a housing, a plurality of gears, a clutch selectively engageable with the plurality of gears, a hydraulic actuator for actuating the clutch, and a fluid passageway in hydraulic communication with the hydraulic actuator and an exterior of the housing of the gearbox.

4. The fluid retention assembly of claim 3 wherein the first portion of the valve housing is press fit into the fluid passageway of the hydraulic assembly and the third portion of the valve housing is sealed against the fluid passageway of the gearbox, and wherein the fluid passageway of the gearbox further includes a shoulder portion, and wherein the shoulder portion abuts the second member to provide the external net force.

5. The fluid retention assembly of claim 1 wherein the valve housing further defines a shoulder portion in the central bore, and wherein the biasing member abuts the second member and the shoulder portion of the valve housing to bias the first member.

6. The fluid retention assembly of claim 5 wherein the sealing portion of the valve housing includes a conical surface and the sealing portion of the first member includes a conical surface, and wherein the conical surface of the valve housing seals with the conical surface of the first member.

7. The fluid retention assembly of claim 6 wherein the sealing portion of the first member further includes a cylindrical surface, and wherein the cylindrical surface of the first member seals against an interior surface of the valve housing.

8. The fluid retention assembly of claim 1 wherein the valve housing includes a first component, a second component, and a third component, wherein the first component defines the first portion and a portion of the second portion of the valve housing, the second component defines a portion of the second portion of the valve housing, and the third component defines the third portion and a portion of the second portion of the valve housing, and wherein the first and third components each include a substantially cylindrical inner surface and the second component defines a plurality of circumferentially spaced fluid apertures disposed in the central bore of the valve housing.

9. The fluid retention assembly of claim 8 wherein the sealing portion of the first member defines a plurality of fluid apertures that are circumferentially offset from the plurality of fluid apertures of the second component of the valve housing.

10. The fluid retention assembly of claim 9 wherein the second component of the valve housing includes a rotation restriction feature to restrict rotation of the shaft of the first member.

11. The fluid retention assembly of claim 10 wherein the biasing member abuts the sealing portion of the first member to bias the first member against the second component of the valve housing and restrict the bi-directional fluid flow through the valve housing.

12. A powerpack assembly for a vehicle transmission, the powerpack assembly comprising:

a hydraulic assembly including a housing, a hydraulic distribution system, and a fluid passageway, wherein the fluid passageway is in hydraulic communication with an exterior of the housing and the hydraulic distribution system;

a valve housing having a first portion, a second portion, a third portion, and defining a central bore having a sealing portion, wherein the first portion is substantially cylindrically shaped and has a first diameter, the second portion is adjacent the first portion and has a substantially cylindrical shape that is coaxial with the first portion and has a second diameter that is larger than the first diameter of the first portion, and wherein the third portion is adjacent the second portion and has a substantially cylindrical shape that is coaxial with the first and second portions, and wherein the first portion of the valve housing is sealed to the fluid passageway of the hydraulic assembly and the second portion of the valve housing is sealed to the housing of the hydraulic assembly;

a first member disposed at least partially in the central bore of the valve housing and including a shaft portion and a sealing portion opposing the sealing portion of the valve housing;

a second member that is substantially disc shaped and defines a plurality of fluid apertures, wherein the second member is attached to the shaft portion of the first member opposite the sealing portion; and a biasing member disposed at least partially in the central bore of the valve housing coaxial with the first member and having a biasing force that biases the sealing portion of the first member against the sealing portion of the valve housing, and wherein an ingress of dust and contaminants and a bi-directional fluid flow between the first portion and the third portion of the valve housing are substantially restricted in the absence of an external net force on the first and second members and the bi-directional fluid flow is substantially unrestricted when the external net force on the first and second members exceeds the biasing force of the biasing member.

13. The fluid retention assembly of claim 12 wherein the hydraulic distribution system of the hydraulic assembly includes a plurality of valves for selectively distributing fluid through the fluid passageway.

14. The fluid retention assembly of claim 13 further including a gearbox fixed to the hydraulic assembly, wherein the gearbox includes a housing, a plurality of gears, a clutch selectively engageable with the plurality of gears, a hydraulic actuator for actuating the clutch, and a fluid passageway in hydraulic communication with the hydraulic actuator and an exterior of the housing of the gearbox, wherein the first portion of the valve housing is press fit into the fluid passageway of the hydraulic assembly and the third portion of the valve housing is sealed against the fluid passageway of the gearbox, and wherein the fluid passageway of the gearbox further includes a shoulder portion, and wherein the shoulder portion abuts the second member to provide the external net force.

15. The fluid retention assembly of claim 12 wherein the valve housing further defines a shoulder portion in the central bore, and wherein the biasing member abuts the second member and the shoulder portion of the valve housing to bias the first member.

16. The fluid retention assembly of claim 15 wherein the sealing portion of the valve housing includes a conical surface and the sealing portion of the first member includes a conical surface, and wherein the conical surface of the valve housing seals with the conical surface of the first member, and wherein the sealing portion of the first member further includes a cylindrical surface, and wherein the cylindrical surface of the first member seals against an interior surface of the valve housing.

17. The fluid retention assembly of claim 12 wherein the valve housing includes a first component, a second component, and a third component, wherein the first component defines the first portion and a portion of the second portion of the valve housing, the second component defines a portion of the second portion of the valve housing, and the third component defines the third portion and a portion of the second portion of the valve housing, and wherein the first and third components each include a substantially cylindrical inner surface and the second component defines a plurality of circumferentially spaced fluid apertures disposed in the central bore of the valve housing.

18. The fluid retention assembly of claim 17 wherein the sealing portion of the first member defines a plurality of fluid apertures that are circumferentially offset from the plurality of fluid apertures of the second component of the valve housing, and wherein the second component of the valve housing includes a rotation restriction feature to restrict rotation of the shaft of the first member, and wherein the biasing member abuts the sealing portion of the first member to bias the first member against the second component of the valve housing and restrict the bi-directional fluid flow through the valve housing.

19. A powerpack assembly for a vehicle transmission, the powerpack assembly comprising:
a hydraulic assembly including a housing, a hydraulic distribution system, and a fluid passageway, wherein the fluid passageway is in hydraulic communication with an exterior of the housing and the hydraulic distribution system;
a valve housing having a first portion, a second portion, a third portion, and defining a central bore having a cylindrical surface and a sealing portion with a conical surface, wherein the first portion is substantially cylindrically shaped and has a first diameter, the second portion is adjacent the first portion and has a substantially cylindrical shape that is coaxial with the first portion and has a second diameter that is larger than the first diameter of the first portion, and wherein the third portion is adjacent the second portion and has a substantially cylindrical shape that is coaxial with the first and second portions, and wherein the first portion of the valve housing is sealed to the fluid passageway of the hydraulic assembly and the second portion of the valve housing is sealed to the housing of the hydraulic assembly, wherein the valve housing further defines a shoulder portion in the central bore;
a first member disposed at least partially in the central bore of the valve housing and including a shaft portion and a sealing portion opposing the sealing portion of the valve housing, wherein the sealing portion has a conical surface and a cylindrical surface, and wherein the conical surface of the valve housing seals with the conical surface of the first member, and wherein the cylindrical surface of the first member seals against the conical surface of the central bore of the valve housing;
a second member that is substantially disc shaped and defines a plurality of fluid apertures, wherein the second member is disposed on the shaft portion of the first member opposite the sealing portion; and
a biasing member disposed at least partially in the central bore of the valve housing coaxial with the first member and having a biasing force that biases the sealing portion of the first member against the sealing portion of the valve housing, and wherein the biasing member abuts the second member and the shoulder portion of the valve housing to bias the first member, and
wherein an ingress of dust and contaminants and a bi-directional fluid flow between the first portion and the third portion of the valve housing are substantially restricted in the absence of an external net force on the first and second members and the bi-directional fluid flow is substantially unrestricted when the external net force on the first and second members exceeds the biasing force of the biasing member.

* * * * *